May 13, 1958 G. TOOTHILL 2,834,191
INFINITELY VARIABLE TORQUE TRANSMITTER
Original Filed May 25, 1951 2 Sheets-Sheet 1

Inventor
Geoffrey Toothill
By

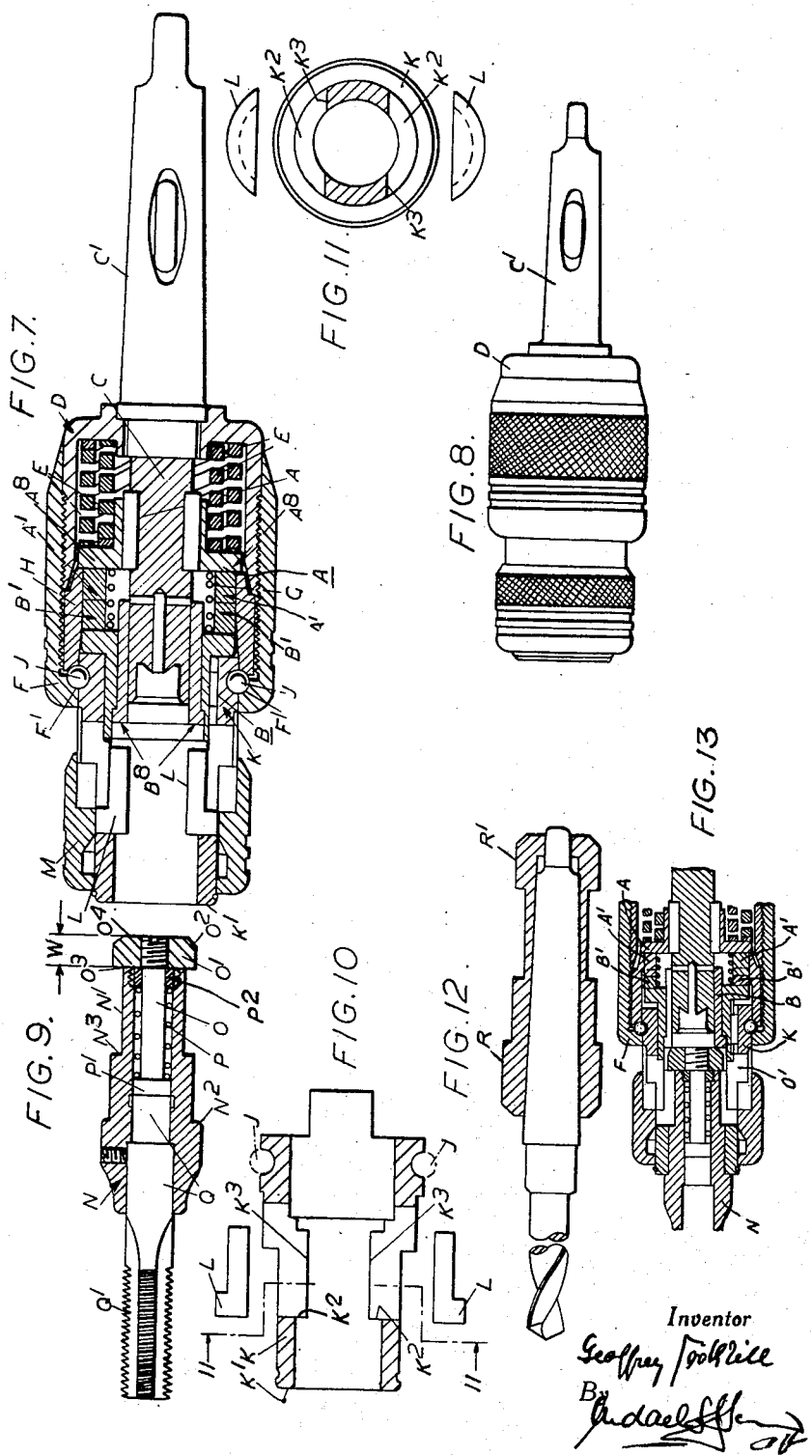

United States Patent Office 2,834,191
Patented May 13, 1958

2,834,191
INFINITELY VARIABLE TORQUE TRANSMITTER

Geoffrey Toothill, Shelf, near Halifax, England, assignor to William Asquith Limited, Halifax, England, a British company Continuation of abandoned application Serial No. 228,169, May 25, 1951. This application March 22, 1957, Serial No. 649,587

12 Claims. (Cl. 64—29)

This application is a continuation of application Serial No. 228,169, filed May 25, 1951, now abandoned.

This invention comprises an infinitely variable torque transmitter for transmitting a drive from a driving member to a driven member through interengaging surfaces provided with means whereby they can be engaged to variable depths, one or more of the interengaging surfaces being so curved that when the driven member has received a pre-set torque depending upon the depth of engagement of the curved surface or surfaces and the amount of a resistance, or load, slip will take place and the transmission from the driving member to the driven member will cease.

The invention is based upon the principle that when one curved surface is tangential to another, in the plane of normal movement slip can take place between them with a minimum amount of resistance and the resistance to slip increases with the depth of engagement of the surfaces and this depth can be pre-set by causing one surface to overlap or cut into the path of the other to any predetermined depth.

The driving and driven members may by way of example comprise two coaxially arranged cylinders capable of being turned, and moved in an endwise direction relatively to one another and on each opposed face of each cylinder are one or more, preferably two projections each of which may have one or two curved surfaces which may be generated from an arc of a circle and constructed to produce a line contact with one another. One of the cylinders is provided with means whereby it can be set at varying overlapping distances in relation to the other. This may be effected by means of a member that is inserted in the torque transmitter different members being inserted to obtain different torques.

The invention is applicable to the driving of tools in rotary spindle machines in which it is advantageous to transmit variable torques to tools of different natures, sizes and constructions to prevent such tools from becoming over-loaded and broken and in order to enable these variable torques to be transmitted, a separate adaptor may be provided for holding each tool, each adapter being formed or provided with a portion which when inserted in the torque transmitter will vary the relative position of the inter-engaging surfaces for the purpose of varying the torque.

Independent means may also be provided for varying the torque to suit any particular circumstances.

The invention is particularly applicable to power driven screw cutting appliances and is hereinafter described with reference to a power driven tapping unit and is designed for use in a drilling or other appropriate revolving spindle machine.

The present invention has among its objects to introduce an improved arrangement for varying the torque between the driving and driven clutch members of a tapping unit to suit different materials, and to provide an adaptor suitable for holding drills and other non-tapping tools.

Accordingly, it is the general object of this invention to provide a machine tool attachment for driving rotary cutting tools which allows adjustment with relative accuracy, and over a wide range, of the torque transmitted to the cutting tool. More specifically, it is an object to provide an attachment in the form of an adapter for the machine tool spindle having associated therewith a family of individual cutting tool carriers, wherein each carrier is selectively and removably received within the adaptor, and forms with the adaptor, an overload release type clutch which drives the cutting tool at the selected torque. A related object is to facilitate obtaining a desired torque by selection of one of the cutting tool carriers, which carrier is effective as an incident to insertion in the adaptor to condition the clutch elements in such relation as to transmit the desired torque.

In order that the said invention may be clearly understood and readily carried into effect the same is descirbed more fully with reference to the accompanying drawings, in which:

Figures 1, 2 and 3 are perspective views of the driving and driven members of an infinitely variable torque transmitter constructed in accordance with this invention for transmitting a drive from one member to the other;

In Figure 1 the two members are partly engaged;
In Fig. 2 they are more deeply engaged; and
In Fig. 3 they are fully engaged.

Fig. 7 is a section of a tapping unit with the invention applied thereto, the driving and driven members being shown fully disengaged;

Fig. 8 is an elevation of the tapping unit shown in Figure 1 and drawn to a smaller scale;

Fig. 9 is a section taken through a tap adaptor for use in the tapping unit;

Fig. 10 is an exploded view of an adaptor bush and driving keys, the bush being shown in section;

Fig. 11 is a section taken on line 11—11 of Fig. 10;

Fig. 12 is a section taken through a drill adaptor for use in the tapping unit; and Fig. 13 is a fragmentary sectional view showing the tap adaptor of Fig. 9 arranged in the operative position within the tapping unit of Fig. 7.

Figure 1:
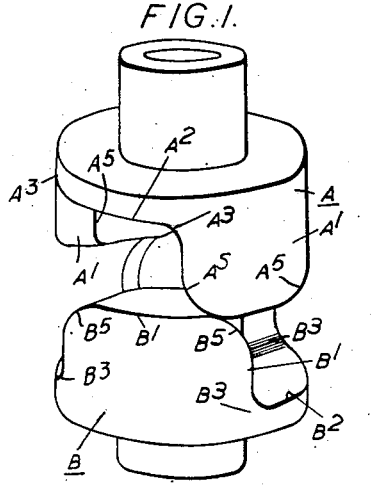
Figure 2:
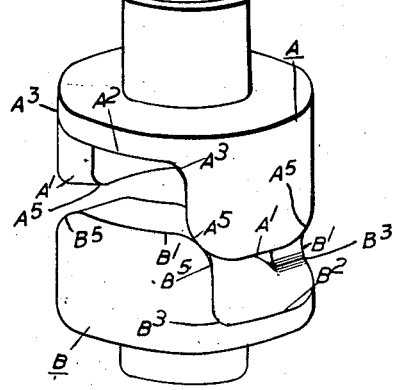
Figure 3:
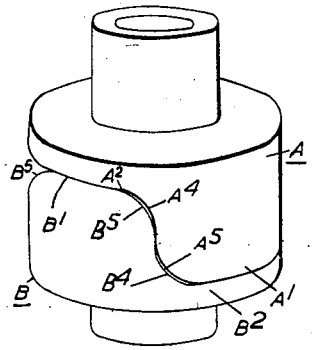
Figure 4:
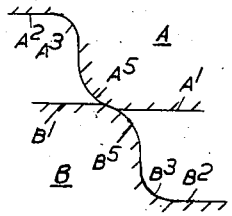
Figs. 4, 5 and 6 are flat layouts of same.
Figure 5:
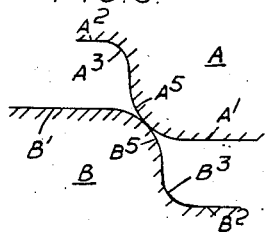
Figure 6:
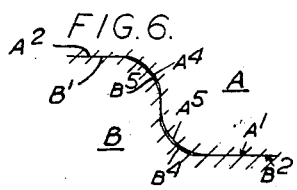

Referring to Figures 1 to 5, A indicates one member and B the other member. These members comprise by way of example two coaxially arranged cylinders capable of being turned relatively to one another and of being moved in an endwise direction relatively to one another and on each opposed face of each cylinder are one or more, preferably two projections $A^1$ $B^1$ and two recesses $A^2$ $B^2$, the corners $A^3$ $B^3$ may be radiused out as shown at $A^4$ $B^4$ in Figs. 3 and 6.

Each projection may have one or two curved surfaces $A^5$ $B^5$ which may be generated from an arc of a circle and constructed to produce a line contact with one another throughout the entire width of the surfaces.

An examination of these figures shows clearly that when one curved surface is tangential to the other in the plane of normal movement slip can take place between them with a minimum amount of resistance and the resistance to slip increases with the depth of engagement of the two surfaces until finally no slip can take place.

Referring to Figs. 7 to 13 the tapping unit embodies the following main parts, a center shaft C having a tapered or parallel shank $C^1$ or other holder for fixing in the machine spindle. A spring housing D that is rigidly fixed on the center shaft and one or more helical compression springs E, an adjusting nut F that engages a thread on the spring housing and enables the torque to be adjusted if and when required, a flanged driving clutch member A with the curved surfaces substantially as described and shown with reference to Figures 1 to 3 that is slidably keyed on the center shaft and a driven clutch member B with the aforesaid curved surfaces that is freely mounted on the center shaft, a compression spring G that tends to separate the clutch members, a bearing bush H that occupies a position between the flange $A^8$ on the driving clutch member and a ring of balls J in an adaptor bush K slidably keyed to the driven clutch member B and formed with slots $K^2$ for outwardly displaceable driving keys L encircled by a locking ring M which can be turned and slid on the adaptor bush for effecting the engagement and disengagement of the keys L with flats $K^3$ on the adaptor bush K, the said ring of balls also bearing on a ball race $F^1$ in the adjusting nut, thus preventing axial movement of the adaptor bush K except with the adjusting nut F and bearing bush H, yet leaving the adaptor bush K free to rotate within them when the clutch members A, B are disengaged.

To adjust the torque, the adjusting nut F is screwed in one direction or the other on the spring housing D thereby varying the distance between the flange $A^8$ of the driving clutch member and the rear face of the spring housing and so altering the compression of the helical springs E which are confined between the end of the spring housing and the flange on the driving clutch member.

To regulate the adjustment to suit different materials, the spring housing may be marked around its peripheral portion with the names of the different material to be tapped, such for example as steel, cast iron, brass, aluminum and plastic with an indication mark appertaining to each material and the adjusting nut may also bear an indication mark adapted to be turned to a position in which it will coincide with one or other of the indication marks on the spring housing.

A tap adaptor or tool carrier N for use with the tapping device, is constructed in such a manner that it is capable of free independent endwise movement in relation to the tapping device and machine spindle and is also capable of controlling the depth of engagement of the curved surfaces of the driving and driven clutch members to give the correct torque for driving taps of different sizes and in different materials without breakage.

For this purpose the tap adaptor contains a plunger O encircled by a spring P confined between a head $P^1$ on the plunger and a stop screw $P^2$ screwed into the end of the tap adaptor N the outer end of the plunger having fixed on it a locating positioning piece or control portion $O^1$ of any predetermined width W, with a conical end $O^2$. The control portion $O^1$ acts as a moving means in the manner discussed below. The front end of the adaptor is bored and shaped to fit the shank Q of the tap $Q^1$.

When the adaptor is pushed into position in the adaptor bush K the conical end $O^2$ of the positioning piece $O^1$ displaces the driving keys L outwardly and a shoulder $N^2$ on the tap adaptor abuts against the face $K^1$ of the adaptor bush and the locking ring can then be moved thereon to move the keys into locking engagement with flats $N^1$ formed on the adaptor between a shoulder $N^3$ thereon and the shoulder $O^3$ formed by the positioning piece $O^1$ and permanently hold the latter from axial movement, leaving the tap adaptor free to move in an endwise direction independently of the tapping unit against the action of the compression spring P within the adaptor so that the body of the tap adaptor N and consequently the tap is quite free to move axially independently of the unit, or the machine spindle.

When the adaptor is moved into the aforesaid position the face of the positioning piece $O^4$ engages the positioning face $B^8$ of the driven clutch member B and moves the curved surfaces $B^5$ on the latter into engagement with the curved surfaces $A^5$ on the driving clutch member A to a predetermined extent depending on the width W of the positioning piece $O^1$ which varies for each different adaptor and alters the transmission torque of the unit accordingly. The above described operative position is shown in Fig. 13. The member B is shown made in two parts to facilitate construction but it could be made in one part.

An adaptor R for holding drills or other non-tapping tools may be somewhat similar to the tap holder adaptor as far as the fitting diameter, driving flats and positioning piece are concerned with the exception that the latter $R^1$ would be made in a piece with the adaptor and of sufficient length to engage the clutch driving and driven members to their full capacity.

I claim as my invention:

1. A driving unit for rotary cutting tools, comprising, in combination, a drive shaft turnable about its axis; slippable clutch means engageable to different extents for slipping at different driving forces and connected to said drive shaft to be rotated thereby for driving a tool with a maximum force which varies with the extent of engagement of said clutch means, the latter including a driven clutch element having a positioning face in a plane extending across said axis and means for supporting said driven clutch element for movement from a fully disengaged position, where said plane including said positioning face is at a predetermined point of said axis, along said axis to an engaged position of predetermined extent; a tool carrier having a control portion included between a free end face of said tool carrier and a second face of said tool carrier directed oppositely from said end face and located at a predetermined distance therefrom; and adaptor means for positioning said tool carrier with said faces thereof in planes extending across said axis, with said end face thereof in engagement with said positioning face of said driven clutch element, and with said second face of said carrier located at less than said predetermined distance along said axis from said point, said adaptor means being connected to said driven clutch element for rotation therewith and for transmitting the drive from said driven clutch element to said tool carrier, whereby said control portion of said carrier moves said driven clutch element into a predetermined extent of engagement.

2. A driving unit for rotary cutting tools, comprising, in combination, a drive shaft turnable about its axis; slippable clutch means engageable to different extents for slipping at different driving forces and connected to said drive shaft to be rotated thereby for driving a tool with a maximum force which varies with the extent of engagement of said clutch means, the latter including a driven clutch element having a positioning face in a plane extending across said axis and means for supporting said driven clutch element for movement from a fully disengaged position, where said plane including said positioning face is at a predetermined point of said axis, along said axis to an engaged position of predetermined extent; a tool carrier having a control portion included between a free end face of said tool carrier and a second face of said tool carrier directed oppositely from said end face and located at a predetermined distance therefrom; and adaptor means, including a stop mounted thereon at a place spaced from said point a distance along said axis less than said predetermined distance, for positioning said tool carrier with said faces thereof in planes extending across said axis, with said end face thereof in engagement with said positioning face of said driven clutch element, and with said second face of said carrier in engagement with said stop, said adaptor means being connected to said driven clutch element for rotation therewith and for transmitting the drive from said driven clutch element to said tool carrier, whereby said control portion of said carrier moves said driven clutch element into a predetermined extent of engagement.

3. A driving unit for rotary cutting tools comprising, in combination, a drive shaft turnable about its axis and having a free end; a driving element slidably keyed to said drive shaft for rotation therewith and for sliding movement therealong, said driving element having an annular portion from which a plurality of driving teeth spaced by gaps from each other about said drive shaft extend toward the free end thereof, each driving tooth having at its end distant from said annular portion of said driving element a free edge portion provided with opposite convexly curved extremities; a driven element mounted on said shaft for free axial and rotational movement with respect to the same, said driven element having a positioning face in a plane extending across said axis and having an annular portion from which a plurality of driven teeth identical with said driving teeth extend respectively toward said gaps, so that when a curved extremity of each driving tooth engages a curved extremity of an adjacent driven tooth said elements will slip with respect to each other when the driving force rises above a predetermined value and will rotate together when the driving force is below said predetermined value, while said elements will be in permanent driving engagement when said driven teeth are moved completely into said gaps, respectively, and while said elements will be in a fully disengaged position when said teeth are out of contact with each other, at which fully disengaged position said plane including said positioning face is at a predetermined point of said axis; first spring means engaging said driving element and urging the same toward said driven element; stop means engaging said driving element to limit the movement thereof toward said driven element; second spring means located between said driving and driven elements and engaging said driven element for urging the latter away from said driving element; a tool carrier having a control portion included between a free end face of said tool carrier and a second face of said tool carrier directed oppositely from said end face and located at a predetermined distance therefrom; and adaptor means, including a stop mounted thereon at a place spaced from said point a distance along said axis less than said predetermined distance, for positioning said tool carrier with said faces thereof in planes extending across said axis, with said end face thereof in engagement with said positioning face of said driven element and with said second face of said carrier in engagement with said stop, said adaptor means being connected to said driven element for rotation therewith and for transmitting the drive from said driven element to said tool carrier, whereby said control portion of said carrier moves said driven element against the action of said second spring means into a predetermined extent of engagement with said driving member and whereby said first spring means is compressed when said elements slip with respect to each other.

4. A driving unit for rotary cutting tools comprising, in combination, a drive shaft turnable about its axis and having a free end; a driving element slidably keyed to said drive shaft for rotation therewith and for sliding movement therealong, said driving element having an annular portion from which a plurality of driving teeth spaced by gaps from each other about said drive shaft extend toward the free end thereof, each driving tooth having at its end distant from said annular portion of said driving element a free edge portion provided with opposite convexly curved extremities; a driven element mounted on said shaft for free axial and rotational movement with respect to the same, said driven element having a positioning face in a plane extending across said axis and having an annular portion from which a plurality of driven teeth identical with said driving teeth extend respectively toward said gaps, so that when a curved extremity of each driving tooth engages a curved extremity of an adjacent driven tooth said elements will slip with respect to each other when the driving force rises above a predetermined value and will rotate together when the driving force is below said predetermined value, while said elements will be in permanent driving engagement when said driven teeth are moved completely into said gaps, respectively, and while said elements will be in a fully disengaged position when said teeth are out of contact with each other, at which fully disengaged position said plane including said positioning face is at a predetermined point of said axis; first spring means engaging said driving element and urging the same toward said driven element; stop means engaging said driving element to limit the movement thereof toward said driven element; second spring means located between said driving and driven elements and engaging said driven element for urging the latter away from said driving element; a tool carrier having a control portion included between a free end face of said tool carrier and a second face of said tool carrier directed oppositely from said end face and located at a predetermined distance therefrom; and adaptor means for positioning said tool carrier with said faces thereof in planes extending across said axis, with said end face thereof in engagement with said positioning face of said driven element and with said second face of said carrier located at less than said predetermined distance along said axis from said point, said adaptor means being connected to said driven element for rotation therewith and for transmitting the drive from said driven element to said tool carrier, whereby said control portion of said carrier moves said driven element against the action of said second spring means into a predetermined extent of engagement with said driving member and whereby said first spring means is compressed when said elements slip with respect to each other.

5. A driving unit for rotary cutting tools comprising, in combination, a drive shaft having a free end; a driving element slidably keyed to said drive shaft for rotation therewith and for sliding movement therealong, said driving element having an annular portion from which a plurality of driving teeth spaced by gaps from each other about said drive shaft extend toward the free end thereof, each driving tooth having at its end distant from said annular portion of said driving element a free edge portion provided with opposite convexly curved extremities; a driven element mounted on said shaft for free axial and rotational movement with respect to the same, said driven element having an annular portion from which a plurality of driven teeth identical with said driving teeth extend respectively toward said gaps; first spring means engaging said driving element and urging the same toward said driven element; stop means engaging said driving element to limit the movement thereof toward said driven element; second spring means located between said driving and driven elements and engaging said driven element for urging the latter away from said driving element; a tubular adaptor connected to said driven element for rotation therewith; and a tool carrier received in said adaptor having a control portion operatively connected to said driven element and moving the latter through a predetermined distance toward said driving element against the action of said second spring means, said control portion being of predetermined extent for moving the driven element through said predetermined distance whereby the extent to which said driving and driven teeth engage each other is automatically controlled by said tool carrier according to a desired torque setting for the tool to be driven by the unit so that upon partial extent of engagement of said teeth, the curved extremities of the driving teeth engage the curved extremities of the driven teeth and said elements slip with respect to each other upon th tool driven by the unit attaining the desired torque setting, and upon full extent of engagement of said teeth positive drive is produced between said elements with no slip.

6. In a driving unit for rotary cutting tools having a drive shaft and a tubular adaptor adapted to be driven by the drive shaft, the combination comprising a normally disengaged overload release type clutch having a driving element slidably keyed to said drive shaft for rotation therewith and for sliding movement therealong, said driving element having an annular portion from which a plurality of driving teeth spaced by gaps from each other about said drive shaft extend toward the free end thereof, each driving tooth having at its end distant from said annular portion of said driving element a free edge portion provided with opposite convexly curved extremities; and a driven element mounted on said shaft for free axial and rotational movement with respect to the same, and connected to said adaptor for rotation therewith, said driven element having an annular portion from which a plurality of driven teeth identical with said driving teeth extend respectively toward said gaps, the driving teeth and the driven teeth being engageable to a predetermined extent to afford a drive connection between the drive shaft and the adaptor according to a desired torque setting for the tool to be driven by the unit; spring means located between said driving and driven elements and engaging said driven element for urging the latter away from said driving element; a tool carrier received in said adaptor having a control portion operatively connected to said driven element, said control portion being of predetermined extent for effecting such predetermined extent of engagement against the action of said spring means, and means yieldably urging said elements into such engagement enabling release of said clutch upon the tool attaining the predetermined desired torque setting.

7. In a variable torque output clutch attachment for driving rotary cutting tools from a machine tool, the combination comprising, a tubular adaptor for fastening in the machine tool and holding a rotary cutting tool for engagement with a workpiece, said adaptor having a drive shaft for turning by the machine tool spindle, a plurality of tool carriers, said tool carriers each being selectively and removably received within the adaptor, and an overload release type clutch connecting said drive shaft and a selected one of said plurality of tool carriers inserted in the adaptor, the torque at which said clutch will slip being predetermined by said tool carrier in accordance with a desired torque setting for the cutting tool to be mounted therein and driven by the attachment, said clutch including an annular array of driving teeth mounted within said adaptor on the same axis and turning in unison with the drive shaft, an annular array of driven clutch teeth operatively connected to said tool carrier and facing said driving teeth, resilient means for yieldably urging said driving teeth towards clutching engagement with said driven teeth to a limit position and offering resistance to disengaging movement of the driving teeth from this position, and means for disengaging said driven clutch teeth from said driving clutch teeth as an incident to removing the tool carrier from the adaptor, said tool carrier being effective when inserted in the adaptor to move the driven teeth into a predetermined extent of clutching engagement with the driving teeth in accordance with the torque setting desired and for which said carrier was selected from the plurality of tool carriers, camming surfaces on the extremities of the driving teeth providing for cammingly engaging the driven teeth and urging the driving teeth against the resilient means out of clutching engagement with the driven teeth upon the attainment of the desired torque setting, the greater the extent of clutching engagement of the clutch teeth the greater the torque attained before the clutch will slip.

8. In a variable torque output clutch attachment for driving rotary cutting tools from a machine tool, the combination comprising, a tubular adaptor for fastening in the machine tool and holding a rotary cutting tool for engagement with a workpiece, said adaptor having a drive shaft for turning by the machine tool spindle, a tool carrier removably received within the adaptor, and an overload release type clutch connecting said drive shaft and the tool carrier, said clutch including an annular array of driving teeth mounted on the same axis and turning in unison with the drive shaft, an annular array of driven teeth facing said driving teeth and operatively connected to said tool carrier, resilient means for urging said driving teeth towards said driven teeth to a limit position defined by a stop carried within the adaptor and offering resistance to disengaging movement of the driving teeth from this position, said driven teeth being disengaged from said driving teeth as an incident to removing said tool carrier from the adaptor, said tool carrier being effective when inserted in the adaptor to move the driven teeth into a predetermined extent of engagement with the driving teeth to correspond with a desired torque setting at which the clutch will slip, camming surfaces formed on the extremities of said driving teeth providing for cammingly urging the driving teeth out of engagement with the driven teeth upon the attainment of the desired torque setting, the greater the extent of clutching engagement of the clutch teeth the greater the torque attained before the clutch will slip.

9. In a variable torque output clutch attachment for driving rotary cutting tools from a machine tool, the combination comprising, a tubular adaptor for fastening in the machine tool and holding a rotary cutting tool for engagement with a workpiece, said adaptor having a drive shaft for turning by the machine tool spindle, a plurality of tool carriers, said tool carriers each being selectively and removably received within the adaptor, and an overload release type clutch connecting said drive shaft and a selected one of said plurality of tool carriers inserted in the adaptor, the torque at which said clutch will slip being predetermined by said tool carrier in accordance with a desired torque setting for the cutting tool to be mounted therein and driven by the attachment, said clutch including an annular array of driving teeth mounted within said adaptor on the same axis and turning in unison with the drive shaft, an annular array of driven clutch teeth operatively connected to said tool carrier and facing said driving teeth, resilient means for yieldably urging said driving teeth towards clutching engagement with said driven teeth to a limit position and offering resistance to disengaging movement of the driving teeth from this position, means for moving said driven clutch teeth from clutching engagement with said driving clutch teeth as an incident to removing the tool carrier from the adaptor, said tool carrier being effective when inserted in the adaptor to move the driven teeth into a predetermined extent of clutching engagement with the driving teeth to correspond with a coarse torque setting and for which said carrier was selected from the plurality of tool carriers, and means for varying the compressive force of said resilient means for obtaining a fine adjustment of the resistance to disengaging movement of the driving teeth offered thereby to correspond with a fine torque setting, camming surfaces formed on the extremities of said driving teeth providing for cammingly engaging the driven teeth and urging the driving teeth against the resilient means out of clutching engagement with the driven teeth upon the attainment of the desired torque setting, the greater the extent of clutching engagement of the clutch teeth the greater the torque attained before the clutch will slip.

10. In a variable torque output clutch attachment for driving rotary cutting tools from a machine tool, the combination comprising, a tubular adaptor for fastening in the machine tool and holding a rotary cutting tool for engagement with a workpiece, said adaptor having a drive shaft for turning by the machine tool spindle, a tool carrier removably received within the adaptor, and an overload release type clutch connecting said drive shaft and the tool carrier, said clutch including an annular array of driving teeth mounted on the same axis and turning in unison with the drive shaft, an annular array of driven teeth facing said driving teeth and operatively connected to said tool carrier, resilient means for urging said driving teeth towards clutching engagement with said driven teeth to a limit position defined by a stop carried within the adaptor and offering resistance to disengaging movement of the driving teeth from this position, said driven teeth being moved from clutching engagement with said driving teeth as an incident to removing said tool carrier from the adaptor, said tool carrier being effective when inserted in the adaptor to move the driven teeth into a predetermined extent of clutching engagement with the driving teeth to correspond with a desired coarse torque setting, means for varying the compressive force of said resilient means for obtaining a fine adjustment of the resistance to disengaging movement of the driving teeth offered thereby and a final desired torque setting at which the clutch will slip, camming surfaces formed on the extremities of said driving teeth providing for cammingly urging the driving teeth out of clutching engagement with the driven teeth upon the attainment of the desired torque setting, the greater the extent of clutching engagement of the clutch teeth and the greater the compressive force of the resilient means the greater the torque attained before the clutch will slip.

11. In a variable torque output clutch attachment for driving rotary cutting tools from a machine tool, the combination comprising, a tubular adaptor for fastening in the machine tool and holding a rotary cutting tool for engagement with a workpiece, said adaptor having a drive shaft for turning by the machine tool spindle, a plurality of tool carriers, said tool carriers each being selectively and removably received within the adaptor, and an overload release type clutch connecting said drive shaft and a selected one of said plurality of tool carriers inserted in the adaptor, the torque at which said clutch will slip being predetermined by said tool carrier in accordance with a desired torque setting for the cutting tool to be mounted therein and driven by the attachment, said clutch including an annular array of driving teeth mounted within said adaptor on the same axis and turning in unison with the drive shaft, an annular array of driven clutch teeth operatively connected to said tool carrier and facing said driving teeth, resilient means for yieldably urging said driving teeth towards clutching engagement with said driven teeth to a limit position and offering resistance to disengaging movement of the driving teeth from this position, means for disengaging said driven clutch teeth from said driving clutch teeth as an incident to removing the tool carrier from the adaptor, said tool carrier being effective when inserted in the adaptor to move the driven teeth into a predetermined extent of clutching engagement with the driving teeth in accordance with the torque setting desired and for which said carrier was selected from the plurality of tool carriers, camming surfaces on the extremities of the driving teeth providing for cammingly engaging the driven teeth and urging the driving teeth against the resilient means out of clutching engagement with the driven teeth upon the attainment of the desired torque, the greater the extent of clutching engagement of the clutch teeth the greater the torque attained before the clutch will slip, and means for connecting said drive shaft and a selected one of said tool carriers so as to obtain positive drive without slip of said driving and driven clutch teeth.

12. In a variable torque output clutch attachment for driving rotary cutting tools from a machine tool, the combination comprising, a tubular adaptor for fastening in the machine tool and holding a rotary cutting tool for engagement with a workpiece, said adaptor having a drive shaft for turning by the machine tool spindle, a tool carrier removably received within the adaptor, and an overload release type clutch connecting said drive shaft and the tool carrier, said clutch including an annular array of driving teeth mounted on the same axis and turning in unison with the drive shaft, an annular array of driven teeth facing said driving teeth and operatively connected to said tool carrier, resilient means for urging said driving teeth towards said driven teeth to a limit position defined by a stop carried within the adaptor and offering resistance to disengaging movement of the driving teeth from this position, said driven teeth being disengaged from said driving teeth as an incident to removing said tool carrier from the adaptor, said tool carrier being effective when inserted in the adaptor to move the driven teeth into a predetermined extent of engagement with the driving teeth to correspond with a desired torque setting at which the clutch will slip, camming surfaces formed on the extremities of said driving teeth providing for cammingly urging the driving teeth out of engagement with the driven teeth upon the attainment of the desired torque, the greater the extent of clutching engagement of the clutch teeth the greater the torque attained before the clutch will slip, a second tool carrier removably received within the adaptor, and means for connecting said drive shaft and said second tool carrier to obtain positive drive without slip of said driving and driven clutch teeth, said tool carriers being selectively insertable within the adaptor.

References Cited in the file of this patent

UNITED STATES PATENTS

| | | |
|---|---|---|
| 1,634,716 | Kasmaier | July 5, 1927 |
| 1,678,634 | Chandler | July 31, 1928 |
| 1,757,125 | Levedahl | May 6, 1930 |
| 1,913,046 | Callan | June 6, 1933 |
| 2,540,513 | Dodd | Feb. 6, 1951 |